United States Patent [19]

Wheatley

[11] 4,345,739
[45] Aug. 24, 1982

[54] FLANGED SEALING RING

[75] Inventor: Charles Wheatley, Tulsa, Okla.

[73] Assignee: Barton Valve Company, Shawnee, Okla.

[21] Appl. No.: 175,937

[22] Filed: Aug. 7, 1980

[51] Int. Cl.³ .............................................. F16K 3/00
[52] U.S. Cl. ............................ 251/358; 251/DIG. 1;
277/207 R; 277/166
[58] Field of Search ................. 251/358, DIG. 1, 326;
277/166, 207 R

[56] References Cited

U.S. PATENT DOCUMENTS

| 2,585,556 | 2/1952 | Johnson, Jr. | 251/DIG. 1 |
| 2,841,429 | 1/1958 | McCuistion | 251/DIG. 1 |
| 2,886,284 | 5/1959 | Wheatley | 251/358 |
| 3,089,678 | 5/1963 | Grove | 251/358 |
| 3,909,017 | 9/1975 | Engstrom | 277/207 |
| 4,258,925 | 3/1981 | Guyton | 251/29 |

FOREIGN PATENT DOCUMENTS

| 616199 | 3/1961 | Canada | 251/DIG. 1 |
| 659694 | 10/1951 | United Kingdom | 251/358 |
| 840559 | 7/1960 | United Kingdom | 251/DIG. 1 |

Primary Examiner—A. Michael Chambers
Attorney, Agent, or Firm—Head, Johnson & Stevenson

[57] ABSTRACT

An improved flanged sealing ring for valves, and the like, and comprising a rigid annular core member, a resilient covering surrounding the core member, and outwardly extending flange provided on the outer periphery of the resilient covering whereby the cross sectional configuration of the sealing ring is substantially T-shaped, the outer periphery of the sealing ring being of an outwardly bulging configuration oppositely disposed from the flange, and the cross sectional configuration of the rigid core member preferably being of a substantially T-shaped configuration for facilitating reinforcing of the sealing ring.

1 Claim, 8 Drawing Figures

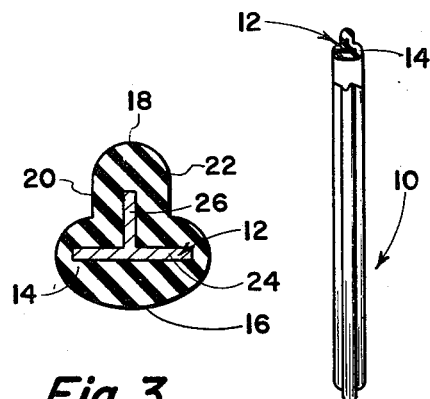
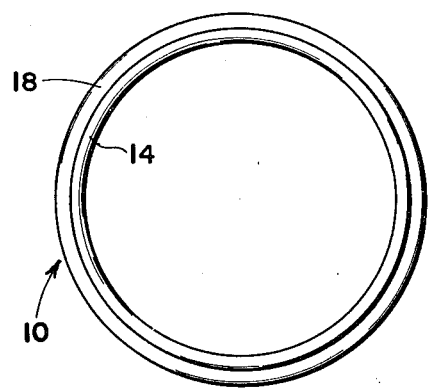
Fig. 3　　Fig. 1　　Fig. 2
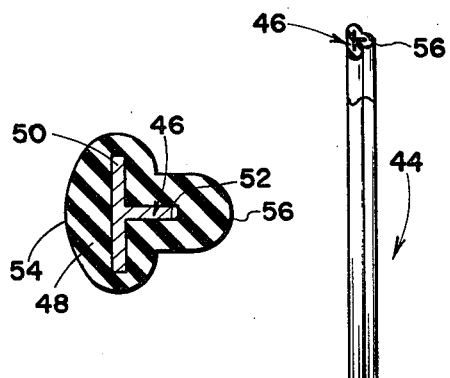
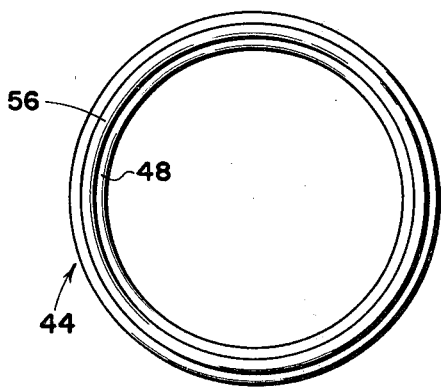
Fig. 6　　Fig. 4　　Fig. 5
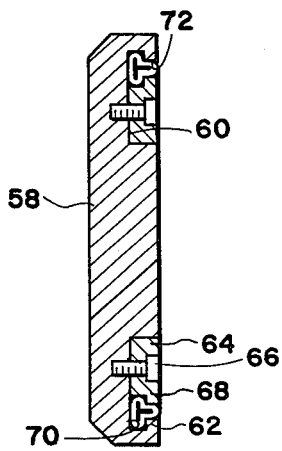
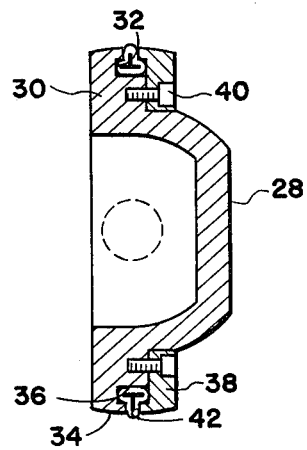
Fig. 8　　Fig. 7

FLANGED SEALING RING

BACKGROUND OF THE INVENTION

1. Field of the Invention

This invention relates to improvements in sealing rings and more particularly, but not by way of limitation, to an improved self-sealing ring adapted for utilization with the closure members of valves.

2. Description of the Prior Art

O-rings are in widespread use today for sealing between the closure member of a valve and the valve seat. These sealing members are efficient in that the generally circular cross sectional configuration of the O-rings lend themselves readily for distortion to fill the seal ring groove to provide a sealing for the valve in the closed position thereof. In actual usage, however, it has been found that these O-ring seals are frequently dislodged from the annular recess or groove, particularly in the event that the closure member is a rotatable gate member. When a rotatable gate member is utilized within a valve body, the sealing member is exposed to the full pressure existing within the valve, and during rotation of the gate member an O-ring may be swept from the groove, and any loss of the sealing ring results in a leakage of fluid around the gate member, causing an inefficient valve.

In order to overcome this disadvantage, a flanged sealing was developed as shown in my prior U.S. Pat. No. 2,886,284, issued May 12, 1959, and entitled "Flanged Sealing Ring". Whereas this sealing ring greatly improved the efficiency of the O-ring type sealing in combination with a rotatable gate member in a valve, it has been found that the flexibility of the sealing ring during compression may not be sufficiently great as to afford the maximum sealing efficiency. In addition, it has been found that the outwardly extending flange may require additional reinforcement in some installations.

SUMMARY OF THE INVENTION

The present invention contemplates an improved flanged sealing ring generally similar to that shown in my aforementioned prior patent, but particularly designed and constructed for overcoming the forefounding disadvantages. The novel sealing ring is particularly designed for use in combination with a gate valve, but not limited thereto, and is of a substantially T-shaped cross sectional configuration to provide the advantages of the O-ring type sealing qualities while overcoming the disadvantages of the ease of dislodging of the O-ring seals under these operation conditions. The novel sealing ring is provided with a rigid inner core surrounded by a resilient covering adapted to engage the inner portion of the valve body to provide an efficient seal around the gate member. The rigid inner core is of a width greater than that of the opening through which the resilient covering extends into sealing engagement with the valve body, thus precluding accidental dislodging of the sealing ring from the groove by the pressure within the valve during rotation of the gate member. The T-shaped configuration of the sealing ring permits the cross bar portion of the Tee to be disposed within the sealing ring groove, and the leg of the Tee to project from the groove for engagement with the valve body in the closed position of the valve. The outer periphery of the cross bar portion of the Tee oppositely disposed from the leg portion of the Tee is substantially bulbous in configuration, thus providing an initial relatively small area of engagement between the sealing ring and the bottom of the groove. In this manner considerable compression area is provided for deformation of the resilient material of the sealing ring during the sealing position thereof in the closed condition of the valve. In addition, the rigid inner core member may also be of a substantially T-shaped cross sectional configuration whereby the cross bar of the Tee is disposed within the cross bar of the resilient material portion of the sealing ring, and the leg of the Tee of the core extends into the Tee of the resilient material for a reinforcing thereof. The novel flanged sealing ring is simple and efficient in operation and economical and durable in construction.

BRIEF DESCRIPTION OF THE DRAWINGS

FIG. 1 is a side elevational view, partly in section, of a sealing ring embodying the invention.

FIG. 2 is a front elevational view of the sealing ring shown in FIG. 1.

FIG. 3 is an enlarged broken sectional view of the sealing ring shown in FIGS. 1 and 2.

FIG. 4 is a side elevational view, partly in section, of a modified sealing ring embodying the invention.

FIG. 5 is a front elevational view of the sealing ring shown in FIG. 4.

FIG. 6 is an enlarged broken sectional view of the sealing ring shown in FIGS. 4 and 5.

FIG. 7 is a sectional elevational view of the preferred embodiment of the invention disposed within a gate member of a valve.

FIG. 8 is a sectional elevational view of a modified sealing ring disposed within a gate member of a valve.

DETAILED DESCRIPTION OF THE PREFERRED EMBODIMENT

Referring to the drawings in detail, and particularly FIGS. 1, 2 and 3, reference character 10 generally indicates a sealing gasket or ring of generally circular configuration and comprising an annular metallic core 12 molded within a resilient covering 14, preferably made of neoprene or the like, but not limited thereto. The inner periphery 16 of the ring 10 is preferably of a bulbous cross sectional configuration generally resembling the outer periphery of the well known O-ring, as particularly shown in FIG. 3, for a purpose as will be hereinafter set forth. A radially and outwardly extending circumferential flange or shoulder 18 extends around the outer periphery of the ring 10, thus providing oppositely disposed shoulders 20 and 22 adjacent the flange 18, and forming a substantially T-shaped cross sectional configuration for the resilient covering 14.

The metallic core 12 comprises a substantially cylindrical member 24 having a substantially centrally disposed radially outwardly extending flange 26 provided around the outer periphery thereof, thus providing a substantially T-shaped cross sectional configuration for the core 12 which generally conforms with the cross sectional configuration of the covering 14.

Referring now to FIG. 7, a suitable cup shaped gate member 28 is shown which may be provided within a gate valve assembly (not shown) and with which the sealing ring 10 may be utilized. Whereas the gate member 28 may be of any suitable construction, as shown herein the gate member 28 is provided with an outwardly extending circumferential flange 30 having an annular recess or groove 32 provided around the right hand face thereof as viewed in FIG. 7. The groove 32 forms an annular shoulder 34 extending around the outer periphery of the flange 30, and a substantially cylindrical shoulder portion 36 spaced radially inwardly therefrom. The sealing ring 10 may be disposed around the shoulder 36 and within the groove 32 in such a manner that the inner periphery 16 of the ring 10 bears against the shoulder 36 and the shoulder 20 bears against the shoulder 34. In this manner, the outer end of the flange 18 protrudes beyond the outer periphery of the flange 30 in the relaxed position of the sealing ring 10, and there is a relatively large area of compression provided between the bulbous inner periphery 16 and the shoulder 36. A flanged ring member 38 is disposed against the right hand side of the flange 30, as viewed in FIG. 7, and may be removably secured thereto in any well known manner, such as by a plurality of circumferentially spaced bolts 40. The ring 38 cooperates with the recess or groove 32 to provide a substantially T-shaped cross sectional configuration for the groove generally corresponding to the T-shaped cross sectional configuration of the sealing ring 10, and the ring 38 securely retains the sealing ring 10 within the groove while provided means for access to the sealing ring for replacement thereof if necessary.

As hereinbefore set forth, the radial flange 18 protrudes beyond the outer periphery of the flange 30 in the relaxed position of the ring 10 for engagement with the usual valve seat (not shown) normally provided within the valve assembly (not shown). It will be apparent that the cylindrical member 24 of the core 12 is of a width substantially greater than the hiatus 42 between the shoulder 34 and the flanged ring 38, thus precluding the possibility of the sealing ring 10 being dislodged by fluid pressure passing through the valve. In addition, the flange 26 of the core member 12 reinforces the flange 18 for reducing damage thereto during use of the sealing ring 10. Furthermore, the bulbous inner periphery 16 of the resilient covering 14 provides for increased compression of the sealing ring 10 in the closed position of the valve (not shown) which greatly improves the sealing efficiency of the ring 10 and reduces wear thereto during use.

FIGS. 4, 5 and 6 depict a modified sealing ring 44 comprising a metallic inner core 46 molded within a resilient covering 48. The core 46 comprises a substantially annular member 50 having a substantially centrally disposed cylindrical flange 52 extending outwardly therefrom substantially perpendicularly with respect to the plane of the member 50, thus providing a substantially T-shaped cross sectional configuration for the core 46. The resilient covering is provided with one annular face 54 of a substantially bulbous cross sectional configuration, and a circular flange 56 extending axially outwardly from the opposite face thereof, thus providing a substantially T-shaped cross sectional configuration for the resilient covering.

FIG. 8 shows a typical installation arrangement for the sealing ring 44. A gate member 58 for a gate valve (not shown) is provided with an annular groove or recess 60 on one face thereof having the inner periphery thereof substantially cylindrical and the outer periphery terminating in an inwardly directed shoulder 62. An annular ring 64 is removably secured in the groove 60 in any suitable manner, such as by a plurality of screws or bolts 66. The inner diameter of the ring 64 is substantially equal to the diameter of the inner periphery of the groove 60 for seating thereagainst, and the outer diameter of the ring 64 is smaller than the outer periphery of the groove or recess 60. An outwardly extending circumferential flange 68 is provided around the outer periphery of the ring 64 and cooperates with the shoulder 62 for forming a groove or recess 70 therebetween having a substantial T-shaped cross sectional configuration for receiving the sealing ring 44 therein. The sealing ring 44 may be disposed in the groove 60 prior to positioning of the ring 64 therein, with the sealing ring 44 being placed in such a manner that the bulbous surface 54 therein is disposed against the bottom of the recess 60 and the outer periphery of the sealing ring 44 is adjacent the outer periphery of the groove 60. The ring 64 may then be secured in the groove 60 for bearing against the inner peripheral portions of the sealing ring 44 and retaining the ring 44 securely in place.

It will be apparent that the cylindrical portion 50 of the inner cord member 46 is of a width greater than the hiatus 72 between the shoulders 62 and 68, thus precluding any accidental dislodging of the ring 44 from the T-shaped groove. In addition, the cylindrical flange 56 normally protrudes slightly beyond the outer surface of the ring 64 in the relaxed position of the ring 44, and the bulbous surface 54 provides a relatively great area of compression for the resilient material 48 when the gate member 58 is in a closed position against the valve seat (not shown) of the valve assembly (not shown). The cylindrical flange 52 of the inner core member 46 reinforces the cylindrical flange 56 of the resilient material 48, thus improving the sealing efficiency of the sealing ring 44 and reducing damage thereto during use.

From the foregoing it will be apparent that the present invention provides an improved flanged sealing ring for utilization with the closure member of a valve assembly, and which is so designed to substantially preclude accidental dislodging thereof during operation of the valve. The bulbous configuration of the sealing ring which bears against the bottom of the groove improves the sealing efficiency of the sealing ring, and the T-shaped cross sectional configuration of the inner core member increases the useful life of the sealing ring. Of course, it will be apparent that the sealing ring may be utilized with the T-shaped inner core only, with the elimination of the bulbous sealing surface, or may be utilized with the bulbous sealing surface as a rigid annular or ring-like inner core, if desired.

Whereas the present invention has been described in particular relation to the drawings attached hereto, it should be understood that other and further modifications, apart from those shown or suggested herein may be made within the spirit and scope of this invention.

What is claimed is:

1. In combination with a valve having an annular retaining groove of substantially T-shaped cross-sectional configuration with one open side and a bottom, an annular sealing ring disposed in said groove and comprising a unitary rigid annular core, a resilient covering disposed around the core, an outwardly extending flange provided in the outer periphery of the resilient covering, said rigid core having a width greater than the width of the open side of the groove, said flange extending outwardly through the open side of the groove, said resilient covering having a bulbous surface oppositely disposed with respect to the outwardly extending flange to provide a relatively small area of engagement with the bottom of the groove in an uncompressed condition of the sealing ring and relatively large area of engagement in the compressed condition of the sealing ring, said groove having a surface cooperating with the bulbous surface of said resilient covering whereby a relatively large clearance space for compression is provided between the bulbous surface of the groove surface, and wherein the cross-sectional configuration of the resilient covering is substantially T-shaped and wherein the cross-sectional configuration of the annular core is substantially T-shaped generally corresponding to the cross-sectional configuration of the resilient covering.

* * * * *